United States Patent [19]
Suda

[11] Patent Number: 6,047,139
[45] Date of Patent: *Apr. 4, 2000

[54] CAMERA CAPABLE OF DISPLAY IN FINDER

[75] Inventor: Yasuo Suda, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/970,148

[22] Filed: Nov. 13, 1997

Related U.S. Application Data

[63] Continuation of application No. 08/667,637, Jun. 21, 1996, abandoned.

[30] Foreign Application Priority Data

Jun. 23, 1995 [JP] Japan ................................. 7-179707

[51] Int. Cl.[7] ................................................ G03B 17/20
[52] U.S. Cl. .......................... 396/296; 396/282; 396/287
[58] Field of Search .................................. 396/287, 282, 396/296, 111, 114, 374

[56] References Cited

U.S. PATENT DOCUMENTS

| | | | |
|---|---|---|---|
| 4,698,492 | 10/1987 | Ohtaka et al. | 250/201 |
| 4,745,426 | 5/1988 | Suda et al. | 354/407 |
| 4,750,014 | 6/1988 | Frank | 354/471 |
| 4,777,506 | 10/1988 | Hiramatsu et al. | 354/408 |
| 4,914,282 | 4/1990 | Akashi et al. | 250/201 |
| 5,019,854 | 5/1991 | Mukai et al. | 354/471 |
| 5,053,803 | 10/1991 | Suda et al. | 354/466 |
| 5,130,740 | 7/1992 | Suda et al. | 354/479 |
| 5,182,443 | 1/1993 | Suda et al. | 250/201.2 |
| 5,218,396 | 6/1993 | Morisawa | 354/471 |
| 5,235,380 | 8/1993 | Yamada et al. | 354/471 |
| 5,386,258 | 1/1995 | Nagano | 354/400 |
| 5,489,965 | 2/1996 | Mukai et al. | 354/471 |
| 5,537,184 | 7/1996 | Hasushita et al. | 354/471 |

FOREIGN PATENT DOCUMENTS

| | | |
|---|---|---|
| 61-249034 | 11/1986 | Japan . |
| 6130481 | 5/1994 | Japan . |

*Primary Examiner*—Eddie C. Lee
*Assistant Examiner*—Michael Dalakis
*Attorney, Agent, or Firm*—Fitzpatrick, Cella, Harper & Scinto

[57] ABSTRACT

A camera capable of display in a finder, the camera including a finder optical system that allows a user to view an object to be photographed; a liquid crystal display device positioned within an optical path of the finder optical system; a polarizing member positioned in the optical path of the finder optical system and behind the liquid crystal display device, as viewed along an optical axis of the optical system; and projection device for projecting polarized light beams toward the liquid crystal display device from outside the optical path of the finder optical system.

42 Claims, 8 Drawing Sheets

CAMERA CAPABLE OF DISPLAY IN FINDER

This application is a continuation of application Ser. No. 08/667,637 filed Jun. 21, 1996, now abandoned.

BACKGROUND OF THE INVENTION

1. Field of the Invention

The present invention relates to a camera capable of superimposition display in a finder.

2. Description of the Related Art

Hitherto, there has been known the so-called superimposition display technique utilized in a camera having a plurality of distance measurement fields of view or the like. In the so-called superimposition display, the selected distance measurement field is superimposed onto the subject image in the finder field of view and displayed. In particular, the superimposition display technique employing light emission has the following advantages:

(1) The display will almost always be recognized by the photographer because the display device is lit to draw the photographer's attention;

(2) The display will almost always be recognized by the photographer even when the subject is not bright; and (3) A larger variety of colors can be used for the display color.

Such a camera having a superimposition display device is disclosed for example in Japanese Patent Laid-Open Nos. 61-249034 and 6-130481, both of which have not been filed abroad.

Japanese Patent Laid-Open No. 61-249034 discloses a single-lens reflex camera utilizing a superimposition display device of the light-emission type. In the camera, the display device illuminated from behind is placed below the mirror box, and the light from the subject is projected onto a focusing screen via a half transparent mirror that splits the light beam into a beam section which is directed to the finder system and a beam section that is directed to the focus detecting device.

Japanese Patent Laid-Open No. 6-130481 also discloses a camera utilizing a superimposition display device of the light-emitting type. In the camera, a display device in which the grooves of the diffraction grating is filled with liquid crystal is placed adjacent to the focusing screen. The diffraction light is turned on and off based on changes in the diffraction factor of the liquid crystal that occur when an electrical field is applied, so as to obliquely illuminate the display device to achieve light-emission type superimposition display.

In the superimposition display technique disclosed in Japanese Patent Laid-Open No. 61-249034, however, the image on the liquid crystal display device is magnified a few times when it is projected onto the focusing screen, thus preventing the image to be projected onto the proper location on the focusing screen. Consequently, a displacement from the actual distance measurement field occurs frequently.

In the superimposition display technique disclosed in Japanese Patent Laid-Open No. 130481, such a problem occurs less frequently because the camera comprises a display device that can actually be seen through the finder, and an illuminating device that illuminates the display device. In recent years, however, a camera having a large number of distance measurement fields of view has been more widely used. When this display technique is used in such a camera, other problems arise.

In other words, when display sections serving as focus area frames are provided in correspondence with the positions of the measurement distance field of view of the distance-measuring device, each of which frames together occupy a rather larger area of the photographic screen, the illuminating device must selectively illuminate over a large area of the screen to illuminate the display device. Since the illuminating device illuminates display elements from an oblique angle, the display devices that can be actually illuminated are limited, for example, to those along the horizontal central line of the photographic screen, so that display elements can only be disposed along the horizontal central line. An attempt to solve such a problem causes the size of the camera to increase because a large space is required for the illuminating device.

SUMMARY OF THE INVENTION

According to one aspect, the present invention makes it possible to prevent a reduction in the brightness of a finder optical system by projecting a polarized light beam from outside the optical path of the finder optical system to a liquid crystal display device disposed in the optical path of the finder optical system.

According to another aspect, the present invention makes it possible to prevent a reduction in the brightness of a finder optical system by placing one of the two polarizing members outside the optical path of the finder optical system, with a liquid crystal display device, disposed within the optical path of the finder optical system, being interposed between the two polarizing members.

DESCRIPTION OF THE PREFERRED EMBODIMENTS

A description will now be hereunder given of a superimposition display device that comprises a display member that can actually be seen through the finder, an illuminating device that illuminates the display member with light, and polarization means that cuts off unnecessary light. The superimposition display device may be one displaying the photometric range, the operation instructions, the photography mode, the set up for a particular type of photography such as panoramic photography, or the like. In the preferred embodiments, the superimposition display device described is one displaying focus area frames.

Figure 1:
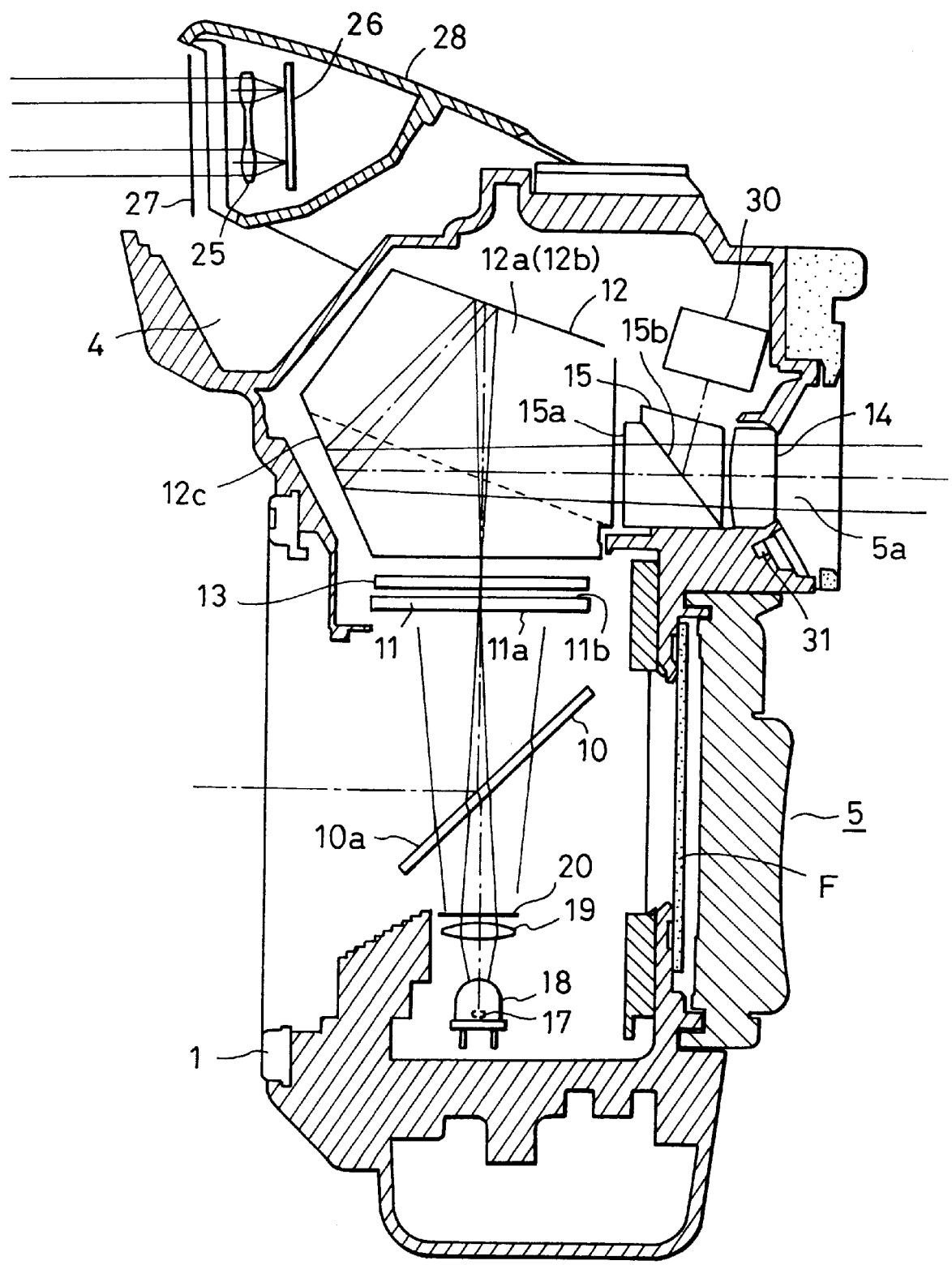
FIG. 1 is a vertical cross sectional view of a first embodiment of a single-lens reflex camera in accordance with the present invention.

FIGS. 1 to 10 are used to describe the first embodiment of the present invention. FIG. 1 is a vertical cross sectional view of the first embodiment of the single-lens reflex camera in accordance with the present invention. Referring FIG. 1, reference numeral 5 denotes the body of the single-lens reflex camera, reference numeral 1 denotes a mount for connecting a photographic lens (not shown), and reference character F denotes a film surface. Reference numeral 10 denotes a movable mirror that reflects a portion of the light beam at mirror face 10a thereof and transmits the rest therethrough and pops up during film exposure. Reference numeral 11 denotes a focusing screen disposed at the plane where the photographic lens is expected to form an image, and including a Fresnel's lens 11a that receives light and a mat surface 11b from where light leaves. Reference numeral 13 denotes a TN liquid crystal display device disposed adjacent to the focusing screen 11, composed of a plurality of focus area frame segments that are superimposed onto an image for display, and utilizing the electric field effect type twisted nematic mode to be described later.

Reference numeral 12 denotes a pentaprism whose reflecting faces are composed of a metal film such as a silver film formed by vapor deposition. Reference numeral 15 denotes a polarized beam splitter having a multi-layered dielectric film formed at the junction 15b of two prisms. Reference numeral 14 denotes an eyepiece, and reference numeral 5a denotes an eyepiece window. The above-described component parts make up the finder system that forms an erect, normal image. Reference numeral 19 denotes a projection lens, reference numeral 18 denotes an LED package that accommodates a light-emitting diode 17 (hereinafter referred to as "LED") serving as an internal light source, and reference numeral 20 denotes a polarizing plate. These component parts are disposed below the movable mirror 10 and together form an illuminating device that illuminates the liquid crystal display device 13.

Accordingly, the main devices required for performing the function of superimposition display are the illuminating device that illuminates the display device 13 with linearly polarized light, the TN liquid crystal display device 13, and the polarized beam splitter 15. In such a construction, the display light generally behaves as follows. First, the LED 17 emits visible light that is gathered by means of the projection lens 19 and formed into a linearly polarized light that passes through the movable mirror 10.

The polarized light, though somewhat dispersed at the focusing screen 11, retains its polarized characteristic and is directed to the TN liquid crystal display device 13. Here, the characteristics of the TN liquid crystal causes the dimension or direction of polarization to rotate 90 degrees for light striking any location other than the display section or any segment of the display section in a non-driven state. In contrast to this, the dimension of polarization for light striking any segment in an operating state remains the same. Thereafter, the light travels in the pentaprism 12 where the polarization condition of the light stays substantially the same, after which the light is split by the polarized beam splitter 15 by being transmitted or reflected in accordance with the dimension of polarization. Proper setting of the direction of polarization of two polarization devices such as the polarizing plate 20 and the polarized beam splitter 15 makes it possible to direct only the LED light that has passed through any segment in an operating state to the eyepiece window 14.

Returning now to the description of the component parts of the camera of FIG. 1, reference numeral 26 denotes a distance-measuring sensor that has two light-receiving areas; reference numeral 25 denotes a light-receiving lens that has two lens sections in correspondence with the two areas; and reference numeral 27 denotes a transparent panel for measuring the distance to each subject on the entire photography screen by employing a known triangulation principle, based on the light beam that has passed through the transparent panel 27. The distance-measuring device is accommodated in a vertically movable box 28 and is popped up by a mechanism (not shown) when the main switch is turned on and accommodated in a recess 4 formed in the camera body when the main switch is turned off.

Reference numeral 30 denotes an eye direction detecting device that detects the eye direction of the photographer along with an LED 31 that emits infrared rays. The infrared rays from the LED 31 illuminates an eye of the photographer and forms a first Purkinje image on the photographer's eye. An area sensor in the eye direction detecting device 30 senses the image on the eye of the photographer via the polarized beam splitter 15 in order to compute the eye direction of the photographer, based on the relationship between the pupil of the photographer and the Purkinje image. Based on the output value of the eye direction detecting device 30, the measurement distance field of view of the distance measuring device is determined in order to select a localized position on the light-receiving areas of the distance-measuring sensor 26.

The location of the determined distance measurement field of view is displayed in the finder, and the photographic lens (not shown) is controlled so as to bring the lens into focus with the subject in the eye direction. Polarization of light of an image being received by the eye direction detecting device 30 reduces ghost beams produced by multiple reflections at the prism face of the pentaprism 12 from where light leaves and at the prism face 15a of the polarized beam splitter 15 that receives light.

A description will now be given of the operation of the single-lens reflex camera.

Figure 4:
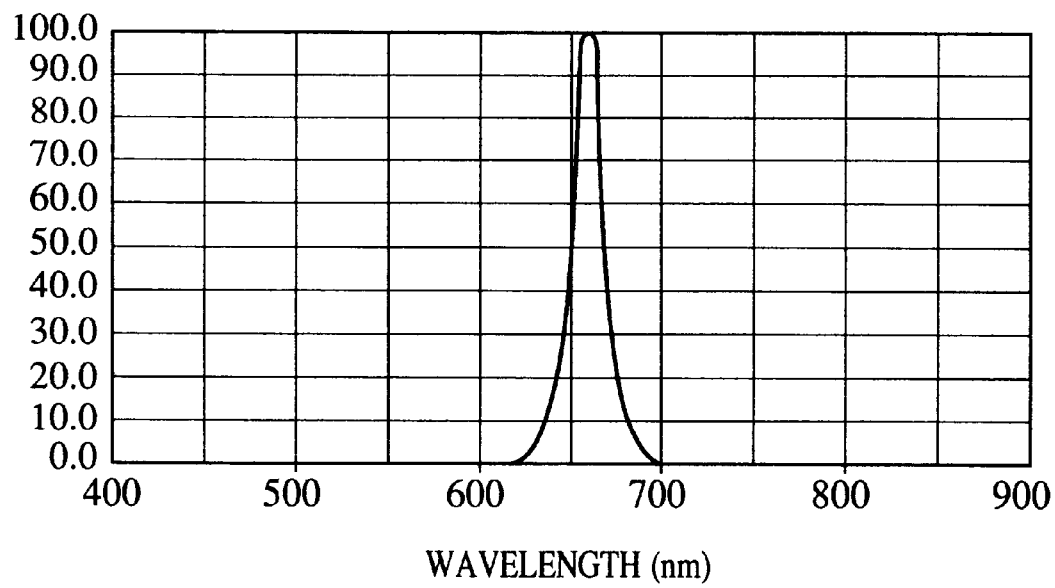
FIG. 4 is a graph showing the relative light-emitting strength of the liquid crystal display (LED) shown in FIG. 1.

FIG. 4 is a graph showing the relative light-emitting strength of the LED and will be used to describe the illuminating device that illuminates the TN liquid crystal display device 13, and the behavior of the illuminating light.

The graph of FIG. 4 shows the relative strengths for each wavelength with respect to the light-emitting strength at the peak wavelength set at 100, and indicates that the LED is of the red-light type that emits wavelengths in the range of from 620 nm to 700 nm, with a mid-value of 660 nm.

Figure 5:
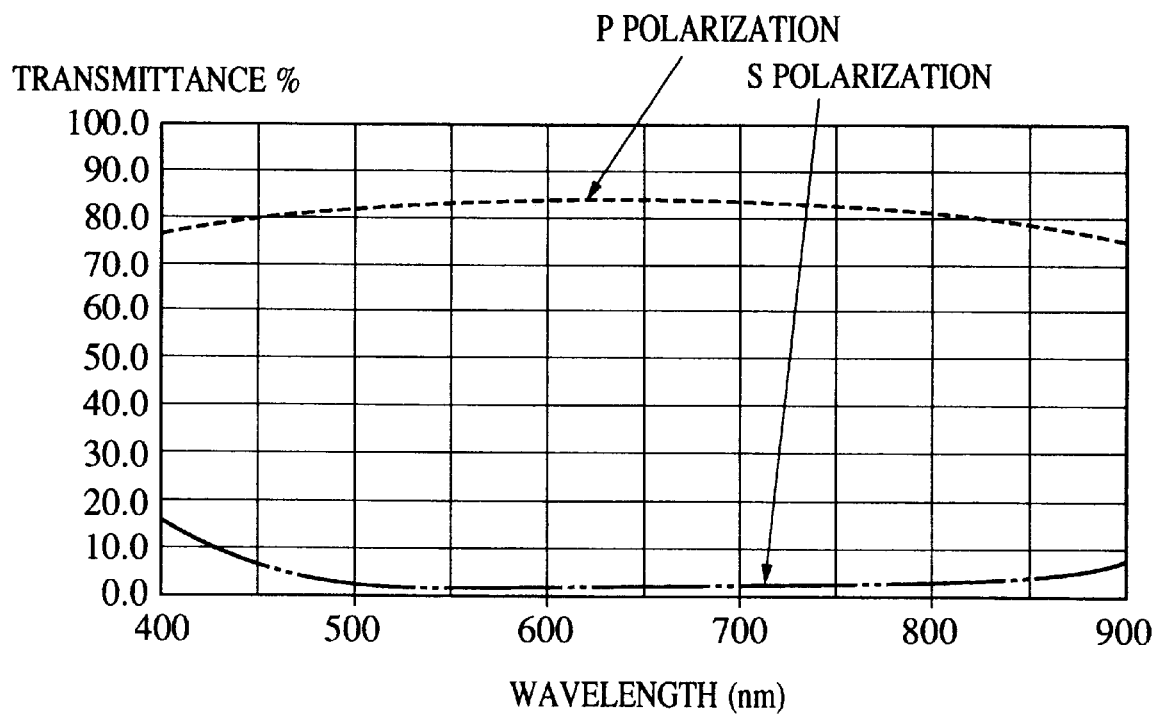
FIG. 5 is a graph showing the transmittance of the polarizing plate shown in FIG. 1.

The light beam from the LED 17, gathered to a certain extent by a domed end of the LED package 18, leaves the LED 17 and is further gathered by the projection lens 19 and directed to the polarizing plate 20. The transmittances of the polarizing plate are shown in FIG. 5. It is high at about 80% with respect to light with P polarization in which the electrical field component vibrates parallel to the plane of the figure, but very low with respect to light with S polarization in which the electrical field component vibrates perpendicular to the plane of the figure.

For the LED 17 having a mid light-emitting wavelength value of 660 nm, the transmittances for light with P polarization and light with S polarization are 84% and 2%, respectively, and the rest of the light is absorbed. Therefore, it can be said that the light beams that have passed through the polarizing plate 20 to illuminate the TN liquid crystal display device 13 are those characterized by P polarization. The dimension of polarization of the light that has been transmitted through the polarizing plate 20 is set taking into account the reflection of the light in the pentaprism.

Figure 6:
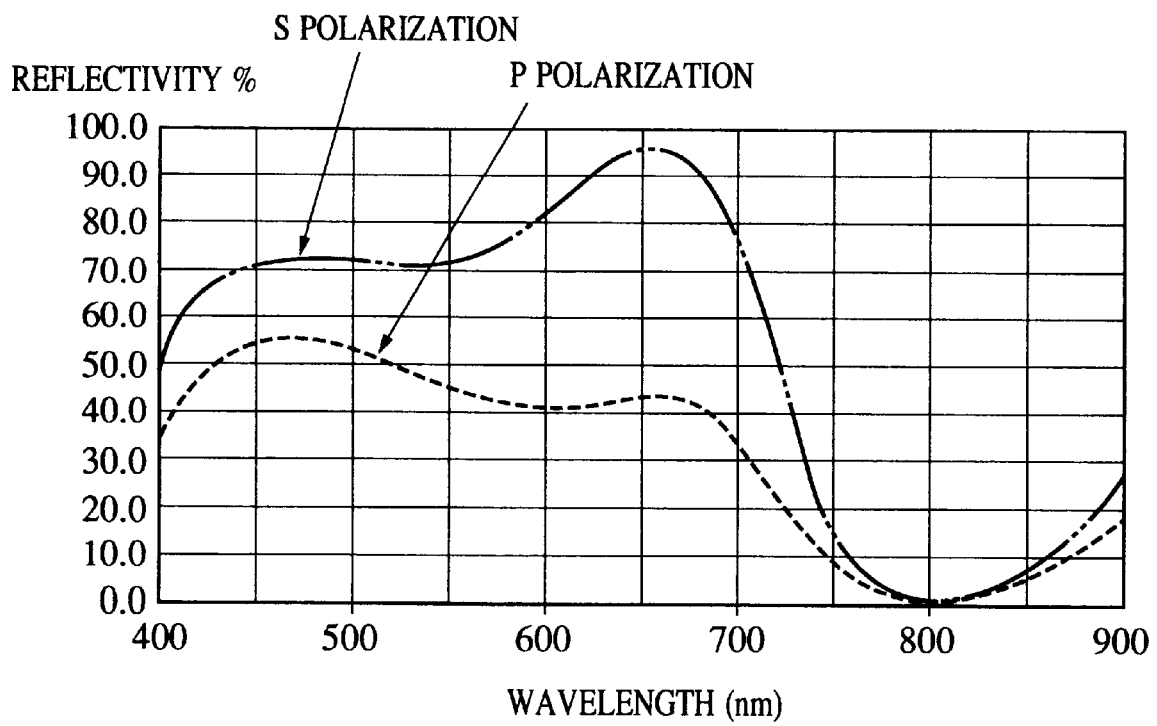
FIG. 6 is a graph showing the reflectivities of the movable mirror of FIG. 1.

The LED light beam, characterized by P polarization, leaves the illuminating device and strikes the movable mirror 10 from its back side. The reflectivities of the face 10a formed by a multi-layered dielectric film are shown in the graph of FIG. 6 which shows that the reflectivity depends on the dimension of polarization. That is, the reflectivity with respect to light with S polarization is very high within the range of from 600 to 700 nm which is contained in the visible range of from 400 to 700 nm, but relatively low at about 40% with respect to light with P polarization. As will be described below, the reflectivities are set thus in order to make uniform the transmittances of the finder in the visible region.

Within the range of from 400 to 600 nm, there is not a large difference between the reflectivity with respect to light with P polarization and the reflectivity with respect to light with S polarization. The reflectivity is generally about 60% in both cases. The mirror coated with the multi-layered dielectric film does not absorb any light so that the rest of the light is transmitted therethrough. Therefore, the transmittance of the light with P polarization at the surface of the movable mirror 10 is 60% within the wavelength range of from 600 to 700 nm, meaning that 60% of the light with P polarization is transmitted through the polarizing plate 20 in the wavelength range of from 600 to 700 nm and the remaining 40% is reflected. The 60% of light that is transmitted is used to operate the TN liquid crystal display device 13.

The LED light that has passed through the movable mirror 10 and arrived at the focusing screen 11 changes its direction when it converges in the equivalent optical axis dimension of the photographic lens, and is somewhat scattered at the mat surface 11b, but the LED light enters the TN liquid crystal display device 13 as a substantially linearly polarized light. In the illuminating device, the refractive power of the projection lens 19, the chip size of the LED 17, and the refractive power of the domed section of the LED package 18 are set so that all the transparent electrodes (described later) are illuminated. The LED light beam strikes the TN liquid crystal display device from a directly opposite direction, so that the display device can be easily illuminated no matter where the display section is placed.

A plurality of a set of LED and projecting lens makes it possible to achieve more uniform illumination. Forming the domed section of the LED package 18 into a relatively large size makes it possible to eliminate the projection lens 19.

A description will now be given of the TN liquid crystal display device 13 with reference to FIG. 2 which is a cross sectional view of the construction thereof. Referring to the figure, reference numerals 40, 41 denote transparent glass substrates that keeps liquid crystal layer 44 in a uniform thickness. Reference numerals 42, 43 denote transparent electrodes (ITO films) that are formed at predetermined locations on the transparent glass substrates, respectively. The liquid crystal is a nematic liquid crystal that exhibits a higher dielectric constant in a direction perpendicular to the major axial direction of the molecules. A very thin liquid crystal molecular orientation layer (not shown) is formed on each side of the liquid crystal layer 44 in the direction of thickness thereof. The direction of orientation is represented by the behavior of the liquid crystal molecules 45 in the figure. When an electric field is not applied, the molecules 45 are oriented parallel to the transparent glass substrates 40, 41, and are in a twisted state by an amount equal to 90 degrees between the two substrates, and have an optical rotatory power of $\pi/2$. In this case, a P-polarized light strikes the orientation layers so that the directions of orientation are made parallel to and perpendicular, respectively, to the plane of the figure in order to prevent coloring of the outgoing light.

When an electric field is applied to the liquid crystal layer by means of the transparent electrodes 42, 43, the liquid crystal molecules 46 are oriented vertically with respect to the extension of the transparent glass substrates 40, 41, because the energy state of the nematic liquid crystal is more stable when the molecular major axes are oriented in the direction of the electric field. Accordingly, application of an electrical field causes the optical rotatory power present before the application to be lost. This means that the dimension of polarization can be changed for polarized light entering the display device 13. Reference numeral 47 in FIG. 2 denotes the dimension of polarization of the polarized light striking the TN liquid crystal display device 13. The polarized light a is one with a P polarization in which the electrical field component vibrates parallel to the plane of the figure. A light beam passing through any section to which an electrical field has not been applied is converted due to the orientation of the liquid crystal molecules into one with an S polarization in which the electrical field vibrates perpendicular to the plane of the figure as indicated by reference numeral 48. On the other hand, the light beam that has passed through any section to which an electrical field has been applied does not have its dimension of polarization changed, so that its dimension of polarization remains the same as indicated by reference numeral 49.

Figure 2:
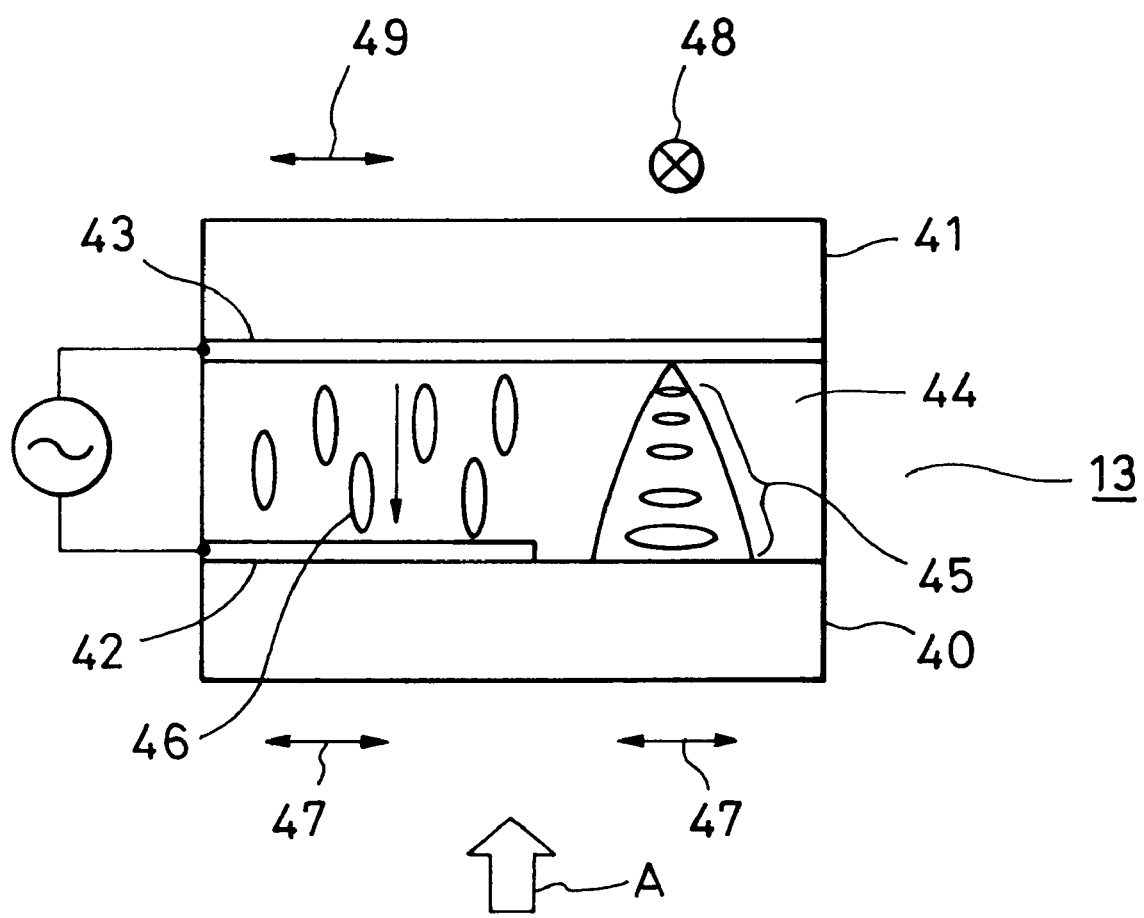
FIG. 2 is a cross sectional view of the construction of the TN liquid crystal display device illustrated in FIG. 1.
Figure 3:
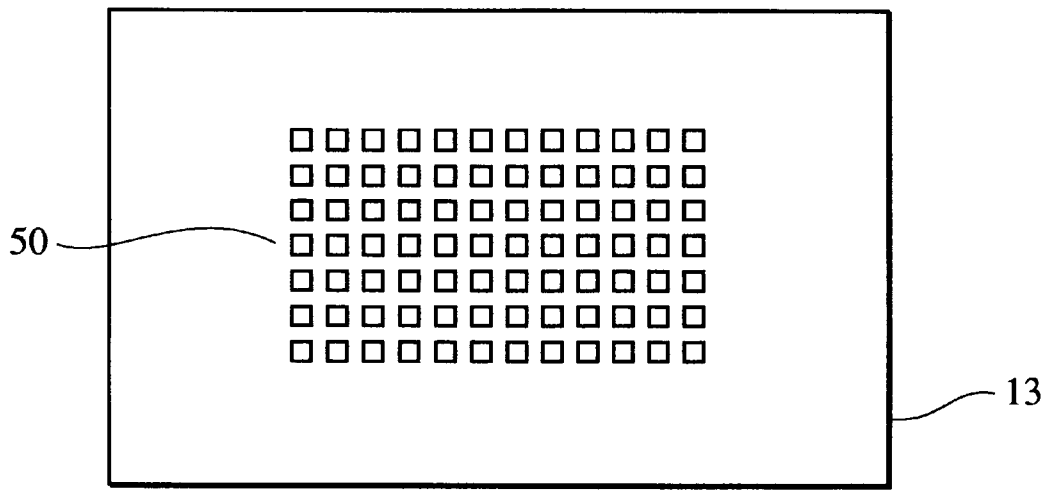
FIG. 3 is a plan view of the TN liquid crystal display device illustrated in FIG. 2.

FIG. 3 is a plan view of the TN liquid crystal display device and is used to describe the actual positioning of the transparent electrode 42 of FIG. 2. Referring to the figure, reference numeral 50 denotes a large number of segments that compose the transparent electrode. These segments, when viewed through the camera finder, are displayed as focus area frames that correspond to the distance measurement field of view of the distance-measuring device. Therefore, compared with the display device of the type in which the image of the focus area frame is projected, it is possible to significantly increase the position precision. In addition, fewer wirings need to be used when multiplex driving at ⅓ duty·⅓ bias is performed and the display section is independently turned on and off.

The LED light beams that have passed through the polarizing plate 20 are P-polarized light beams in the plane of FIG. 1. As described above, the light beams leaving the TN liquid crystal display device 13 can be changed into either a P-polarized light beam or an S-polarized light beam. A description will now be given of why the dimension of polarization is set thus and the optical system to which the LED light beams from the TN liquid crystal display device are directed.

The light beams that have left the TN liquid crystal display device 13 as P- or S-polarized light beams strike the pentaprism 12 which contributes to the formation of an erect, normal image as the finder image. The pentaprism 12 includes a face 12a that is positioned away from the photographer in a plane of the cross section of FIG. 1, a face 12b positioned forwardly and symmetrical to the face 12a, and a final reflection face 12c. The faces are metal-deposited faces of silver, aluminum, or the like. Accordingly, in the pentaprism 12 the LED light beams are reflected a total of three times by the metal faces, two times by the faces 12a and 12b and once by the front face.

In general, the linearly polarized light striking a metallic face is reflected as an elliptically polarized light due to a phase shift caused by a difference in reflection between the P component and the S component at the face where the light beam strikes. As has been briefly described above, superimposition display is achieved by dividing the light components in accordance with the dimension of polarization by the polarized beam splitter 15, so that ideally the polarized light that enters the polarized beam splitter 15 is a linearly polarized light beam. Obviously, the elliptically polarized light beam can be converted back into a linearly polarized light beam by passing it through a suitable phase plate. In such a pentaprism 12, this becomes apparent when a particular light ray that has been reflected a plurality of times is observed.

However, the LED light beams may take different paths depending on the part of the TN liquid crystal display device 13 that they pass and the direction in which they pass therethrough. They may first strike the prism face 12a and be reflected to the prism face 12b, or they may first strike the face 12b and be reflected to the face 12a. In addition, the LED light beams are not divided in the region around the polarized beam splitter 15, so that the use of any phase plate is not effective here. Consequently, a high contrast display cannot be expected. The display contrast is the final transmittance ratio of the transmittance of the segment being driven to the transmittance of the segment that is not being driven. A low final transmittance ratio means that the entire segment that is not being driven glows brightly.

Therefore, in actuality, the display contrast is determined by how much the polarized beam approximates a linearly polarized light beam when it enters the polarized beam splitter 15. It is effective to previously set the dimension of polarization of the linearly polarized light rays that enter the pentaprism 12 in order to minimize the effects of phase shift caused by differences in reflection between the P component and the S component at the face where the light beams enter.

If either the P or S component is present by a much higher percentage than the other component at the face where the light beams strike, the reflected light beam is a linearly polarized light beam, regardless of the phase shift caused by the smaller percentage component. In the pentaprism 12, the P component or the S component is present by a much higher percentage in the case where the light beam is reflected from the face 12a to the face 12b, the light beam is reflected from the face 12b to the face 12a, or the light beam is reflected from the faces 12a·12b to the final reflecting face 12c. Therefore, an elliptically polarized light beam, leaving the pentaprism 12, is substantially a linearly polarized light beam, when the dimension of polarization of the incoming light is either parallel or perpendicular to the plane of FIG. 1.

This means that when the light beam is being reflected, the dimension of polarization is substantially the same or perpendicular to the extension of the face where the light beam strikes. Thus, practically speaking, it can be said that when the dimension of polarization is thus set, the P-polarized light beam entering the pentaprism 12 leaves the pentaprism 12 as a light beam with P polarization, and the S-polarized light beam leaves the pentaprism 12 as a light beam with S polarization. Therefore, the LED light beam that has passed through the polarizing plate 20 is a light beam with P polarization.

The LED light beam from the pentaprism 12 then enters the polarized beam splitter 15.

Figure 7:
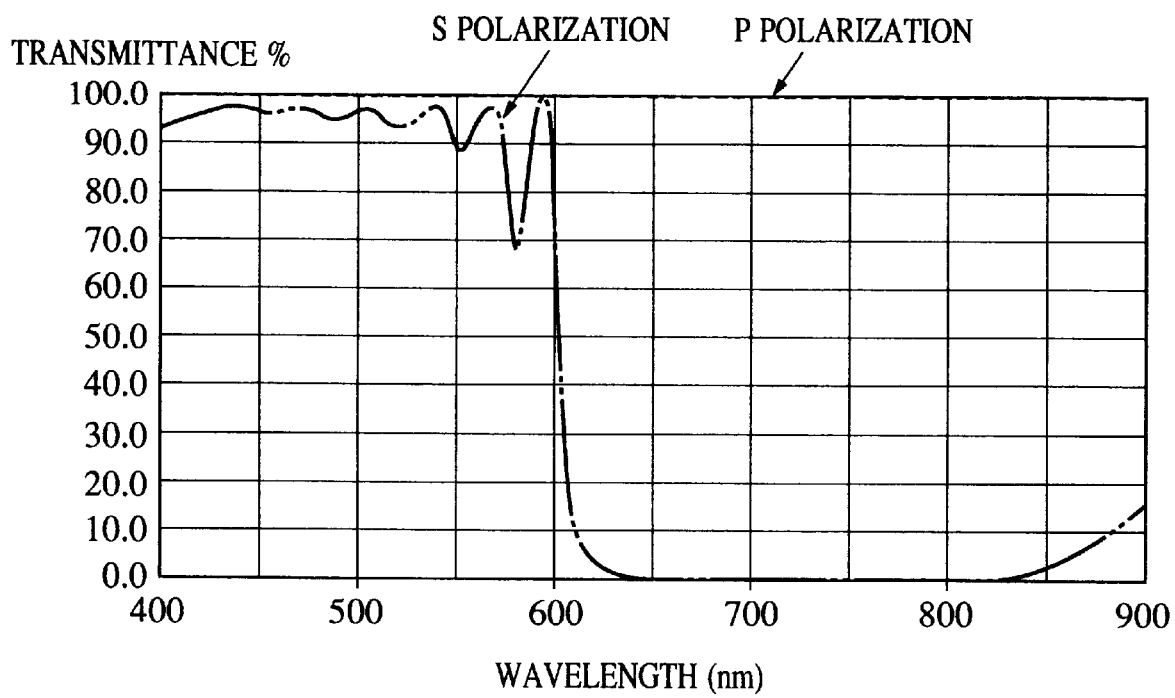
FIG. 7 is a graph showing the transmittances of the polarized beam splitter.

FIG. 7 is a graph showing the transmittances of the polarized beam splitter. Referring to the figure, the transmittance of the splitter is high at almost 100% for a light beam with P polarization in which the electrical field vibrates parallel to the plane of the figure, regardless of the wavelength of the light beam. On the other hand the transmittance for a light beam with S polarization in which the electrical field vibrates perpendicular to the plane of the figure is high between wavelengths ranging from 400 to 600 nm, but low between wavelengths ranging from 600 to 900 nm. Due to the characteristics of the multi-layered dielectric film mirror, the rest of the light is transmitted, so that the light beam with P polarization is transmitted, while the light beam with S polarization is reflected, as is particularly the case for LED light beams with wavelengths falling within the range shown in the graph of FIG. 4.

As described above, LED light beams passing through any part of the TN liquid crystal display device to which an electrical field has not been applied are optically rotated by $\pi/2$ due to the orientation of the liquid crystal molecules and thus becomes light beams with S polarization, whereas those passing through any part of the display device 13 to which an electrical field has been applied remain as light beams with P polarization without their dimension of polarization being changed. More specifically, as can be understood from the graph of FIG. 7, the LED light beams that are transmitted through polarized beam splitter 15 are those that have passed through part of the display device to which an electrical field has been applied, whereas the beams that are reflected are those that have passed through any part to which an electrical field has been applied. The light beams that have been transmitted through the polarized beam splitter 15 travel through the eyepiece 14 and out the eyepiece window 5a of the camera body 5.

As described with reference to FIGS. 2 and 3, the segment 50 of the TN liquid crystal display device 13 is seen as a focus area frame when viewed through the finder. An electrical field can be selectively applied to any of the segments 50, so that an electrical field can be applied to a desired segment in order to make the desired focus area frame alone glow red. The face 15c of the polarized beam splitter 15 has a black coating, so that reflected light beams are absorbed at the face 15c and thus not visually recognized.

The polarized beam splitter 15 is constructed to reflect a light beam with S polarization at a wavelength of 880 nm which is the mid wavelength value emitted by the LED 31 in order to direct to the eye direction detecting device 30 the light emitted from the LED 31 (for use in eye direction detection) and reflected by the eye of the observer. In this way, the same structural component parts can be used for superimposition display and for eye direction detection, thus making it possible to simplify the construction and thus to produce a smaller camera.

Figure 8:
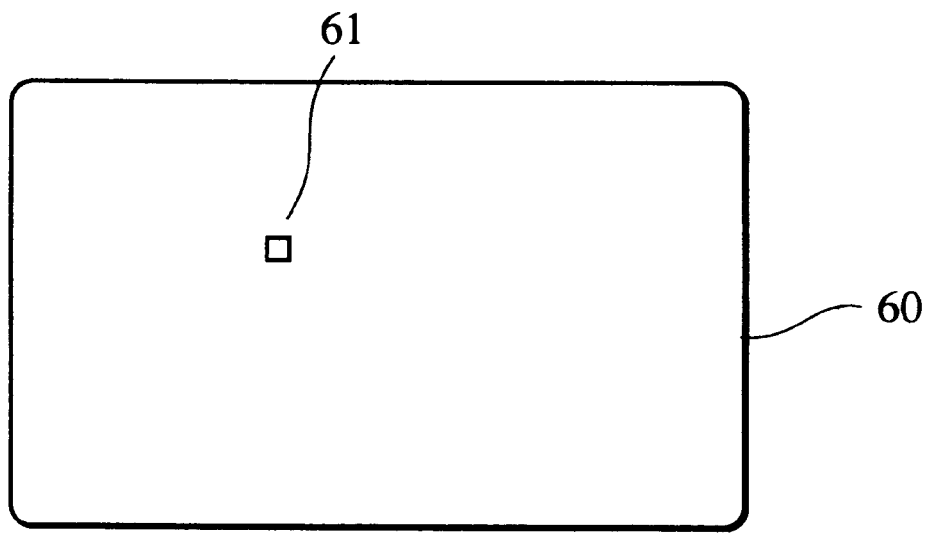
FIG. 8 is a view of a focus area frame on the liquid crystal display device of FIG. 1.
Figure 9:
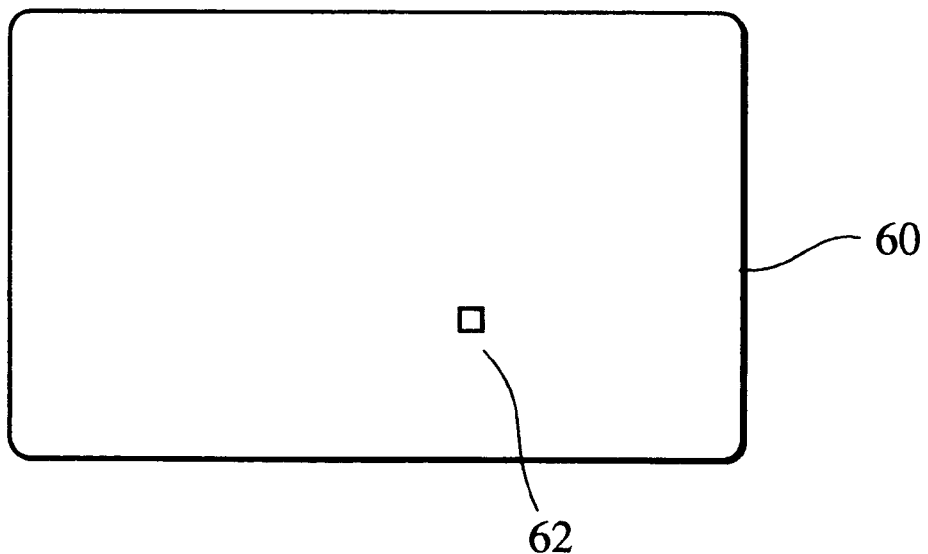
FIG. 9 is a view of another focus area frame on the liquid crystal display device of FIG. 1.

FIGS. 8 and 9 are views showing examples of fields of view of a finder. Referring to the figures, reference numeral 60 denotes a field of view of the finder, and reference numerals 61, 62 denote focus area frames on the finder, each of which indicates a position of the distance measurement field of view of the distance-measuring device. They are images of the segments, included among the segments 50, that are being driven. The focus area frames 61, 62 glow in the same color as the color of the light emitted by the LED 17 shown in FIG. 4, and can be observed simultaneously with the subject image projected onto the focusing screen 11. In the superimposition display of the light emission type, the display section can be provided in a wide area of the photographic screen and the position of display is determined by the TN liquid crystal display device, so that displacements thereof occur less frequently. In addition, since the superimposition display employs light emission, the display device is lit to draw the photographer's attention, allowing the photographer to almost always recognize the display. Consequently, failure to recognize the display occurs less frequently even when the subject is not very bright.

In a suitable operation of the above-described camera, the position of the distance measurement field of view of the distance measured by the distance-measuring device is determined based on the eye-direction information obtained by the eye direction detecting device. The photographic lens brings the subject at that position into focus, and the position of the subject brought into focus on the finder is displayed by superimposition. The polarized beam splitter 15 may be of the plate type, though one having a construction in which the prisms are bonded together has been taken as an example.

Superimposition display has been described based on the behavior of LED light beams. A description will now be given of how the subject image appears. It is preferable that the camera finder be one in which the color phase of the subject and that of the finder image are the same. This can be achieved by making the transmittance uniform over the visible wavelength region. However, the polarized beam splitter, being a component part of the finder system, does not have a uniform transmittance over the visible wavelength range of from 600 to 700 nm, as can be seen from the graph of FIG. 7. More specifically, when the average value of the transmittances for the light beam with P polarization and the light beam with S polarization is considered, the average transmittance for the polarized light between the wavelength region of from 600 to 700 nm is approximately ½ compared to the average transmittance for the polarized light between the wavelength region of from 400 to 600 nm.

Accordingly, the reflectivity of the movable mirror described above is set so as to correct the ununiform transmittance characteristics of the polarized beam splitter 15. More specifically, the subject light beam that has passed through the photographic lens (not shown) is directed to the finder via the movable mirror 10 to cause the transmittance of the splitter 15 to be substantially uniform in the visible wavelength region as determined by the overall characteristics of the reflectivity of the mirror 10 in terms of the wavelengths and the transmittance of the polarized beam splitter 15 in terms of the wavelengths. The correction is manifested by the extremely high reflectivity of the movable mirror for an S-polarized light beam with a wavelength of from 600 to 700 nm.

Figure 10:
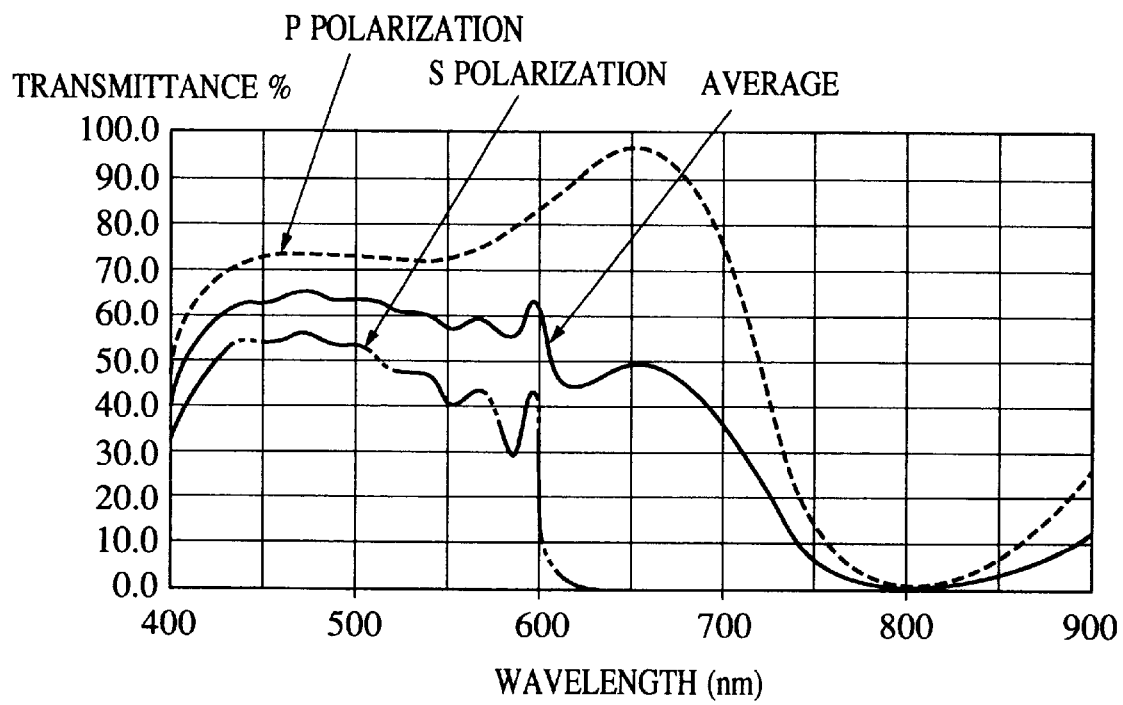
FIG. 10 is a graph showing the transmittances of the finder shown in FIG. 1.

FIG. 10 is a graph showing the overall transmittance of the entire finder system determined by the reflectivity characteristics of the movable mirror 10 and the transmittance characteristics of the polarized beam splitter 15. The average transmittance for light in the wavelength range of from 400 to 600 nm is generally 60%, while the average transmittance for light in the wavelength range of from 600 to 700 nm is approximately 45%. Therefore, in the visible wavelength region, a large change in the transmittance does not occur, so that the color phase of the subject and that of the subject finder image are about the same. In taking a photograph using a common photographic film that actually allows faithful color reproduction of the subject, the degree of similarity between the finder image and the subject image to be photographed is increased.

Another finder property that needs to be considered is its property in relation to polarization. A finder whose transmittance differs greatly in accordance with the dimension of polarization does not cause any problems when natural light is used. However, in such a finder, a light beam coming from the subject with high polarization appears differently from the actual light beam. The most common example is the case where the light beam coming from the blue sky, known to include polarized light, appears darker than it actually is. In other words, the blue sky in the finder would appear as if a polarization filter was placed in front of the photographic lens, but the image on the photographic film appears as it is.

In order to minimize such a problem, according to the present embodiment, the transmittance is such as to be substantially the same with respect to light in a wavelength region of from 400 to 600 nm, regardless of the dimension of polarization, as shown in the graph of FIG. 10. Therefore, in almost all cases, the finder image and the actual image will appear in the same color.

In addition, as can be understood from the foregoing description, according to the present embodiment, the same component parts are used for superimposition display and for eye direction detection, thereby simplifying the construction of the camera and reducing its size. Such a construction is effective in cutting the amount of ghost light beams resulting from multiple reflections that occur when an image is being received by the eye direction detecting device, and makes it less likely for the finder display to go unrecognized by the photographer.

A description will now be given of a second embodiment of the single-lens reflex camera in accordance with the present invention.

Figure 11:
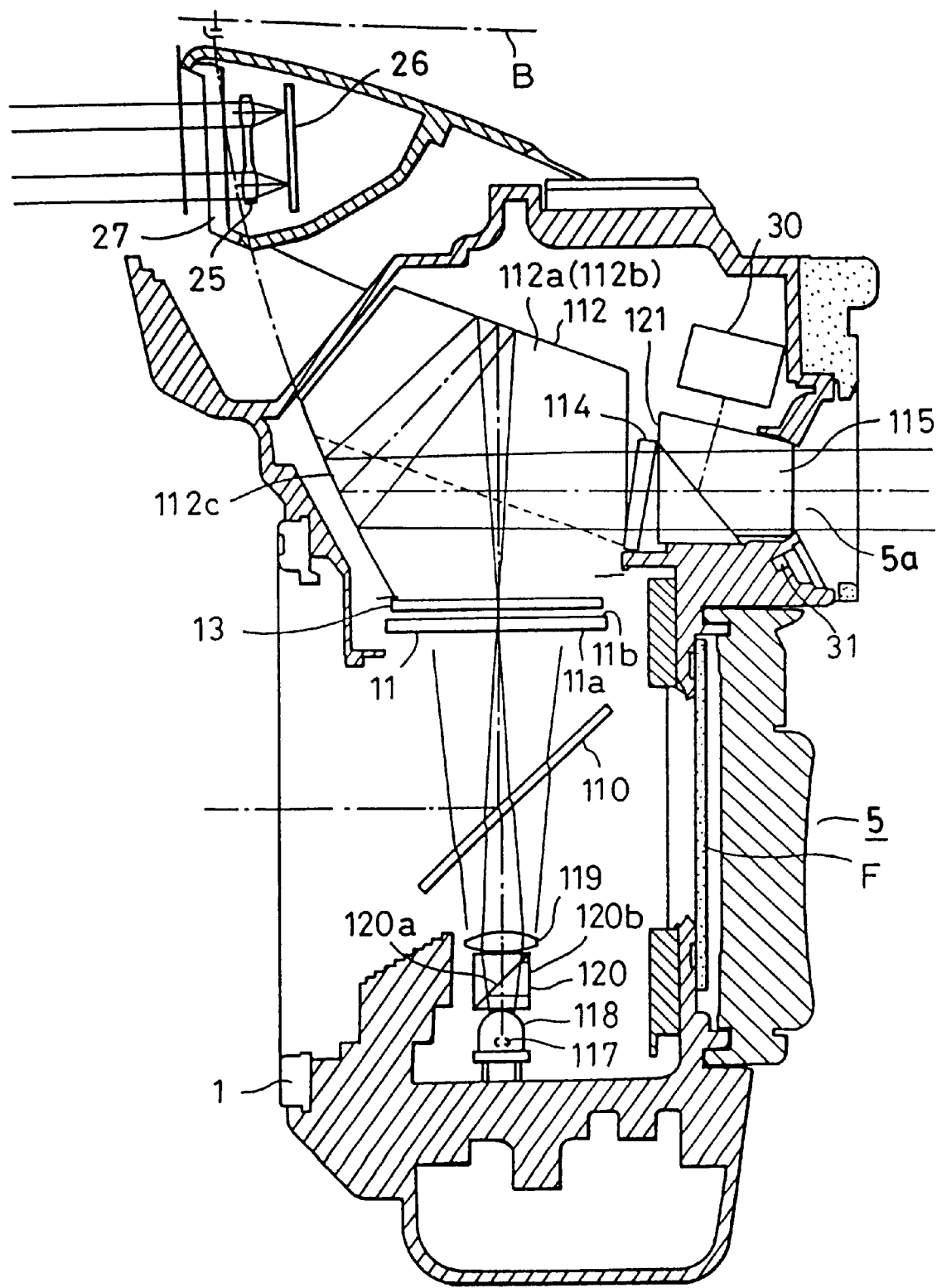
FIG. 11 is a vertical cross sectional view of a second embodiment of a single-lens reflex camera in accordance with the present invention.

FIG. 11 is a vertical cross sectional view of the second embodiment of the single-lens reflex camera in accordance with the present invention.

Referring to the figure, corresponding structural component parts to those of the previous embodiment will be given the same reference numerals, and descriptions that overlap are omitted. Reference numeral 112 denotes a pentamirror. Like the pentaprism, it has a mirror face 112a, a mirror face 112b, and a final reflecting mirror face 112c. The mirror face 112a is located away from the viewer in the cross sectional plane of FIG. 11. The mirror face 112b is located toward the viewer in the plane of the figure and symmetrically to the mirror face 112a. The inside of the pentamirror 112 bordered by the three mirror faces is empty space. The reflecting mirror face is a metal face of, for example, aluminum, and has the same reflectivity characteristics with respect to differently polarized light as the pentaprism.

The final reflecting mirror face 112c is a section of a rotating ellipsoid in which the rotational axis is defined as a line segment B, so that it contributes to raising the finder magnification. The distortion of the finder image that occurs at the final reflecting mirror face 112c is corrected by an eye piece 114 that is a convex lens with decentering and tilting eccentricity components.

Figure 12:
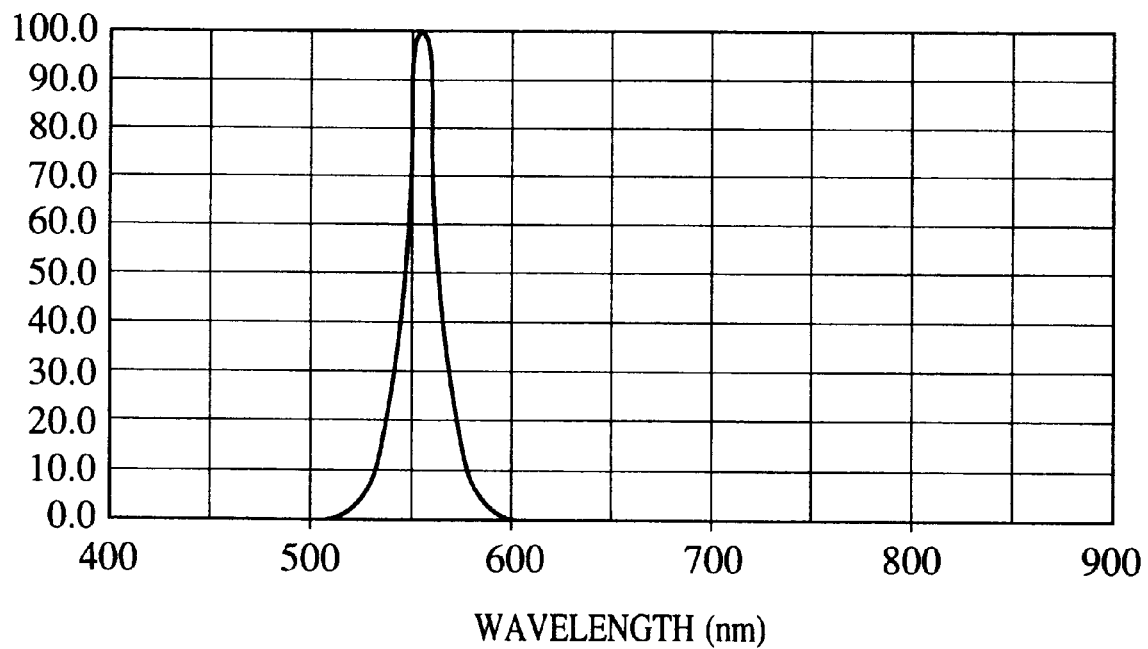
FIG. 12 is a graph showing the relative light-emitting strength of the liquid crystal display shown in FIG. 11.

Reference numeral 121 denotes a polarizing plate and has the same characteristics as the polarizing plate 20 of the first embodiment. The plate 121 uniformly transmits light with P polarization and blocks light with S polarization in the visible wavelength range (refer to FIG. 5). Reference numeral 115 denotes a beam splitter that transmits visible light and reflects infrared light, and functions specifically for detecting the eye direction and not as a polarizing element used for superimposition display. Reference numeral 119 denotes a projecting lens; reference numeral 118 denotes a LED package that accommodates therein an LED 117; and reference numeral 120 denotes a polarized beam splitter. The LED 117 has the same relative light-emitting strengths as the LED whose relative light-emitting strengths are shown by the graph of FIG. 12, and emits green light.

Junction 120a of the two prisms of the polarized beam splitter 120 is formed by a multi-layered dielectric film, from where light with P polarization is directed to the projecting lens 119 and the light with S polarization is directed to a light-absorbing face 120b. Reference numeral 110 denotes a movable mirror. Unlike the movable mirror 10 of FIG. 1, the mirror 110 uniformly reflects light with P polarization and light with S polarization in the visible wavelength range. When its reflectivity of light with S polarization is set at 80% and its reflectivity of light with P polarization is set at 40%, 60% of the light leaving the projecting lens 119 is transmitted therethrough.

A description will now be given of the behavior of the display light beam.

The LED 117 emits green light. The light beam converted into one with P polarization at the beam splitter 120, being a first changing means, is collected and gathered by the projection lens 119, and passes through the movable mirror 110. The light beam, though dispersed to a certain extent at the focusing screen 11, retains is polarization characteristic. With its polarization characteristic retained, the light beam is directed to the TN liquid crystal display device 13. The TN liquid crystal has a property of rotating the dimension of polarization by 90 degrees for any light not passing through the display section or passing through a non-driven segment of the display section.

In contrast to this, the dimension of polarization is not rotated for light passing through a segment in a driven state. The light travels in the pentamirror 112 in substantially the same polarization state, and is directed to the polarizing plate 121 that transmits the light with P polarization, and reflects the light with S polarization. Accordingly, only the LED light beam passing through segment in a driven state of the TN liquid crystal display device 13 is directed to an eyepiece window 105a.

It is possible to cause a particular focus area frame to glow green by applying an electrical field to the desired segment. The focus area frame can be seen simultaneously with the subject image projected on the focusing screen 11. The characteristics of the movable mirror 110 and polarizing plate 121 are uniform in the visible wavelength region, so that the color phase of the subject image does not differ from the color phase of the subject.

Like the case where light emission is utilized to perform superimposition display, according to the present embodiment, it is possible to place the display section over a wide area of the photographic screen, and the display position is determined by the TN liquid crystal display device so that displacements thereof occur less frequently. In addition, since the superimposition display employs light emission, the display device is lit to draw the photographer's attention, allowing the photographer to almost always recognize the display. Consequently, failure to recognize the display occurs less frequently even when the subject is not very bright. Further, a larger variety of colors can be used for the display color, and the image phase of the subject and the image phase of the finder image can be kept the same, without any special correction.

What is claimed is:

1. A camera including a view finder having a visual field and capable of superimposed display in the visual field of the view finder, said camera comprising:

a view finder optical system comprising a focusing screen and a reflective mirror that reflects a portion of a light beam used for photography to said focusing screen, said view finder optical system thereby allowing a user to view an object to be photographed, said reflective mirror reflecting a first percentage of light having a first direction of polarization, and reflecting a second percentage of light having a second direction of polarization, the second percentage being greater than the first percentage;

a liquid crystal display device positioned within an optical path of said view finder optical system;

a polarizing member positioned in the optical path of said view finder optical system and behind said liquid crystal display device, as viewed along a direction of the optical path of said view finder optical system; and a projection device disposed on a side of said reflective mirror opposite said liquid crystal display device, said projection device projecting light having the first direction of polarization through said reflective mirror and toward said liquid crystal display device.

2. A camera according to claim 1, wherein said reflective mirror comprises a multi-layered dielectric film.

3. A camera according to claim 1, wherein said projection device is disposed along a line formed by extending an optical axis of said view finder optical system through said reflective mirror.

4. A camera according to claim 1, wherein said view finder optical system includes an erect image forming optical member and an eyepiece, and wherein said polarizing member is interposed between said erect image forming optical member and said eyepiece.

5. A camera according to claim 1, wherein said view finder optical system includes an eyepiece, and wherein said polarizing member is disposed behind said eyepiece, as viewed along a direction of eye gaze.

6. A camera according to claim 1, further comprising an eye gaze direction detecting device that detects an eye gaze direction of a photographer, wherein said polarizing member directs reversely incident light beams toward said eye gaze direction detecting device.

7. A camera according to claim 6, wherein said polarizing member reflects reversely incident infrared light.

8. A camera according to claim 1, wherein said liquid crystal display device is a twisted nematic liquid crystal display device.

9. A camera including a view finder having a visual field and capable of superimposed display in the visual field of the view finder, said camera comprising:

a view finder optical system comprising a focusing screen and a reflective mirror that reflects a portion of a light beam used for photography to said focusing screen, said view finder optical system thereby allowing a user to view an object to be photographed, said reflective mirror reflecting a first percentage of light having a first direction of polarization, and reflecting a second percentage of light having a second direction of polarization, the second percentage being greater than the first percentage;

a liquid crystal display device disposed within an optical path of said view finder optical system;

a light-emitting device disposed on a side of said reflective mirror opposite said liquid crystal display device, said light-emitting device emitting a light beam toward said liquid crystal display device;

a first polarizing member that polarizes a light beam emitted from said light-emitting device in a first direction of polarization, said first polarizing member being interposed between said light-emitting device and said reflective mirror; and a second polarizing member disposed within the optical path of said view finder optical system and behind said liquid crystal display device, as view along a direction of the optical Path of the view finder optical system.

10. A camera according to claim 9, wherein said reflective mirror comprises a multi-layered dielectric film.

11. A camera according to claim 9, wherein said light-emitting device is disposed along a line formed by extending an optical axis of said view finder optical system through said reflective mirror.

12. A camera according to claim 9, wherein said view finder optical system includes an erect image forming optical member and an eyepiece, and wherein said second polarizing member is interposed between said erect image forming optical member and said eyepiece.

13. A camera according to claim 9, wherein said view finder optical system includes an eyepiece, and wherein said second polarizing member is disposed behind said eyepiece, as view along a direction of eye gaze.

14. A camera according to claim 9, further comprising an eye gaze direction detecting device that detects an eye gaze direction of a user, wherein said second polarizing member directs reversely incident light beams toward said eye gaze direction detecting device.

15. A camera according to claim 14, wherein said polarizing member reflects reversely incident infrared light.

16. A camera according to claim 9, wherein said liquid crystal display device is a twisted nematic liquid crystal device.

17. A camera including a view finder having a visual field and capable of superimposed display in the visual field of the view finder, said camera comprising:

a view finder optical system comprising a focusing screen and a reflective mirror that reflects a portion of a light beam used for photography to said focusing screen, said view finder optical system thereby allowing a user to view an object to be photographed, said reflective mirror reflecting a first percentage of light having a first direction of polarization, and reflecting a second percentage of light having a second direction of polarization, the second percentage being greater than the first percentage;

a liquid crystal display device positioned within an optical path of said view finder optical system;

a polarizing member positioned in the optical path of said view finder optical system and behind said liquid crystal display device, as viewed along the optical path of said view finder optical system; and a projection device that projects light having a first direction of polarization through said reflective mirror and toward said liquid crystal display device.

18. A camera according to claim 17, wherein said reflective mirror comprises a multi-layered dielectric film.

19. A camera according to claim 17, wherein said projection device is disposed along a line formed by extending an optical axis of said view finder optical system through said reflective mirror.

20. A camera according to claim 17, wherein said view finder optical system includes an erect image forming optical member and an eyepiece, and wherein said polarizing member is interposed between said erect image forming optical member and said eyepiece.

21. A camera according to claim 17, wherein said view finder optical system includes an eyepiece, and wherein said polarizing member is disposed behind said eyepiece, as viewed along a direction of eye gaze.

22. A camera including a view finder having a visual field and capable of superimposed display in the visual field of the view finder, said camera comprising:

a view finder optical system comprising focusing screens and a reflective mirror that reflects a portion of a light beam used for photography to said focusing screen, said view finder optical system thereby allowing a user to view an object to be photographed, said reflective mirror transmitting a first percentage of a light beam having a first direction of polarization in a first direction of transmittance through said reflective mirror, and transmitting a second percentage of a light beam having the first direction of polarization in a second direction of transmittance through said reflective mirror, the second percentage being different from the first percentage;

a liquid crystal display device positioned within an optical path of said view finder optical system;

a polarizing member positioned in the optical path of said view finder optical system and behind said liquid crystal display device, as viewed along an optical path of said view finder optical system; and a projection device disposed on a side of said reflective mirror opposite said liquid crystal display device, said projection device projecting light having a first direction of polarization through said reflective mirror and toward said liquid crystal display device.

23. A camera according to claim 22, wherein said reflective mirror comprises a multi-layered dielectric film.

24. A camera according to claim 22, wherein said projection device is disposed along a line formed by extending an optical axis of said view finder optical system through said reflective mirror.

25. A camera according to claim 22, wherein said view finder optical system includes an erect image forming optical member and an eyepiece, and wherein said polarizing member is interposed between said erect image forming optical member and said eyepiece.

26. A camera according to claim 22, wherein said view finder optical system includes an eyepiece, and wherein said polarizing member is disposed behind said eyepiece, as viewed along a direction of eye gaze.

27. A camera according to claim 22, further comprising an eye gaze direction detecting device that detects an eye gaze direction of a photographer, wherein said polarizing member directs reversely incident light beams toward said eye gaze direction detecting device.

28. A camera according to claim 27, wherein said polarizing member reflects reversely incident infrared light.

29. A camera according to claim 22, wherein said liquid crystal display device is a twisted nematic liquid crystal display device.

30. A camera including a view finder having a visual field and capable of superimposed display in the visual field of the view finder, said camera comprising:

a view finder optical system comprising a focusing screen and a reflective mirror that reflects a portion of a light beam used for photography to said focusing screen, said view finder optical system thereby allowing a user to view an object to be photographed, said reflective mirror transmitting a first percentage of a light beam having a first direction of polarization in a first direction of transmittance through said reflective mirror, and transmitting a second percentage of a light beam having the first direction of polarization in a second direction of transmittance through said reflective mirror, the second percentage being different from the first percentage;

a liquid crystal display device disposed within an optical path of said view finder optical system;

a light-emitting device disposed on a side of said reflective mirror opposite said liquid crystal display device, said light-emitting device emitting a light beam toward said liquid crystal display device;

a first polarizing member that polarizes a light beam emitted from said light-emitting device in a first direction of polarization, said first polarizing member being interposed between said light-emitting device and said reflective mirror; and a second polarizing member disposed within the optical path of said view finder optical system and behind said liquid crystal display device, as viewed along a direction of the optical path of said view finder optical system.

31. A camera according to claim 30, wherein said reflective mirror comprises a multi-layered dielectric film.

32. A camera according to claim 30, wherein said light-emitting device is disposed along a line formed by extending an optical axis of said view finder optical system through said reflective mirror.

33. A camera according to claim 30, wherein said view finder optical system includes an erect image forming optical member and an eyepiece, and wherein said second polarizing member is interposed between said erect image forming optical member and said eyepiece.

34. A camera according to claim 30, wherein said view finder optical system includes an eyepiece, and wherein said second polarizing member is disposed behind said eyepiece, as viewed along a direction of eye gaze.

35. A camera according to claim 30, further comprising an eye gaze direction detecting device that detects an eye gaze direction of a user, wherein said second polarizing member directs reversely incident light beams toward said eye gaze direction detecting device.

36. A camera according to claim 35, wherein said polarizing member reflects reversely incident infrared light.

37. A camera according to claim 30, wherein said liquid crystal display device is a twisted nematic liquid crystal device.

38. A camera including a view finder having a visual field and capable of superimposed display in the visual field of the finder, said camera comprising:

a view finder optical system comprising a focusing screen and a reflective mirror that reflects a portion of a light beam used for photography to said focusing screen, said view finder optical system thereby allowing a user to view an object to be photographed, said reflective mirror transmitting a first percentage of a light beam having a first direction of polarization in a first direction of transmittance through said reflective mirror, and transmitting a second percentage of a light beam having the first direction of polarization in a second direction of transmittance through said reflective mirror, the second percentage being different from the first percentage;

a liquid crystal display device positioned within an optical path of said view finder optical system;

a polarizing member positioned in the optical path of said view finder optical system and behind said liquid crystal display device, as viewed along the optical path of said view finder optical system; and a projection device that projects light having the first direction of polarization through said reflective mirror and toward said liquid crystal display device.

39. A camera according to claim 38, wherein said reflective mirror comprises a multi-layered dielectric film.

40. A camera according to claim 38, wherein said projection device is disposed along a line formed by extending an optical axis of said view finder optical system through said reflective mirror.

41. A camera according to claim 38, wherein said view finder optical system includes an erect image forming optical member and an eyepiece, and wherein said polarizing member is interposed between said erect image forming optical member and said eyepiece.

42. A camera according to claim 38, wherein said view finder optical system includes an eyepiece, and wherein said polarizing member is disposed behind said eyepiece, as viewed along a direction of eye gaze.

* * * * *

UNITED STATES PATENT AND TRADEMARK OFFICE
CERTIFICATE OF CORRECTION

PATENT NO. : 6,047,139

DATED : April 4, 2000

INVENTOR(S) : YASUO SUDA

It is certified that error appears in the above-identified patent and that said Letters Patent is hereby corrected as shown below:

At [56] References Cited

FOREIGN PATENT DOCUMENTS

"6130481" should read --6-130481--.

Column 3

Line 22, "Fresnel's" should read --Fresnel--.

Column 6

Line 26, "light a" should read --light A--.

Column 9

Line 44, "ununiform" should read --non-uniform--.

Column 10

Line 38, "cross sectional" should read --cross-sectional--.
    Line 47, "cross sectional" should read --cross-sectional--.

UNITED STATES PATENT AND TRADEMARK OFFICE
CERTIFICATE OF CORRECTION

PATENT NO. : 6,047,139
DATED : April 4, 2000
INVENTOR(S) : YASUO SUDA

It is certified that error appears in the above-identified patent and that said Letters Patent is hereby corrected as shown below:

Column 12

Line 40, "eve" should read --eye--.

Column 13

Line 10, "view" should read --viewed--.
    Line 11, "Path" should read --path--.
    Line 26, "view" should read --viewed--.

Column 14

Line 7, "eve" should read --eye--.

Signed and Sealed this

Third Day of April, 2001

Attest:

NICHOLAS P. GODICI

*Attesting Officer*    *Acting Director of the United States Patent and Trademark Office*